US010817260B1

(12) United States Patent
Huang et al.

(10) Patent No.: US 10,817,260 B1
(45) Date of Patent: Oct. 27, 2020

(54) REDUCING DYNAMIC POWER CONSUMPTION IN ARRAYS

(71) Applicant: Amazon Technologies, Inc., Seattle, WA (US)

(72) Inventors: Randy Huang, Morgan Hill, CA (US); Ron Diamant, Albany, CA (US); Thomas Elmer, Austin, TX (US); Sundeep Amirineni, Austin, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 16/007,749

(22) Filed: Jun. 13, 2018

(51) Int. Cl.
*G06F 7/523* (2006.01)
*G06F 7/544* (2006.01)
*G06N 3/04* (2006.01)
*G06F 7/50* (2006.01)

(52) U.S. Cl.
CPC ............... *G06F 7/523* (2013.01); *G06F 7/50* (2013.01); *G06F 7/5443* (2013.01); *G06N 3/04* (2013.01)

(58) Field of Classification Search
CPC ........ G06F 7/523; G06F 7/5443; G06F 17/15; G06F 17/16
See application file for complete search history.

(56) References Cited

U.S. PATENT DOCUMENTS

| 2016/0358069 | A1* | 12/2016 | Brothers | G06F 7/764 |
| 2018/0164866 | A1* | 6/2018 | Turakhia | G06F 1/3206 |
| 2018/0218518 | A1* | 8/2018 | Yan | G06T 9/002 |
| 2019/0311243 | A1* | 10/2019 | Whatmough | G06N 3/063 |

OTHER PUBLICATIONS

Yu-Hsin Chen, et al., Eyeriss: An Energy-Efficient Reconfigurable Accelerator for Deep Convolutional Neural Networks, IEEE, 2016, 12 pages.

* cited by examiner

Primary Examiner — Chuong D Ngo
(74) Attorney, Agent, or Firm — Kilpatrick Townsend & Stockton LLP

(57) ABSTRACT

Systems and methods are provided to skip multiplication operations with zeros in processing elements of the systolic array to reduce dynamic power consumption. A value of zero can be detected on an input data element entering each row of the array and respective zero indicators may be generated. These respective zero indicators may be passed to all the processing elements in the respective rows. The multiplication operation with the zero value can be skipped in each processing element based on the zero indicators, thus reducing dynamic power consumption.

19 Claims, 8 Drawing Sheets

REDUCING DYNAMIC POWER CONSUMPTION IN ARRAYS

BACKGROUND

Artificial neural networks are computing systems with an architecture based on biological neural networks. A neural network may be implemented by circuitries and data paths, such as a systolic array, which can comprise an array of processing elements capable of performing concurrent arithmetic operations, for example, floating-point multiplications and additions, etc. Power consumption of the systolic array can become critical when a large number of processing elements are performing arithmetic operations concurrently.

BRIEF DESCRIPTION OF THE DRAWINGS

Various embodiments in accordance with the present disclosure will be described with reference to the drawings, in which.

DETAILED DESCRIPTION

Figure 1:
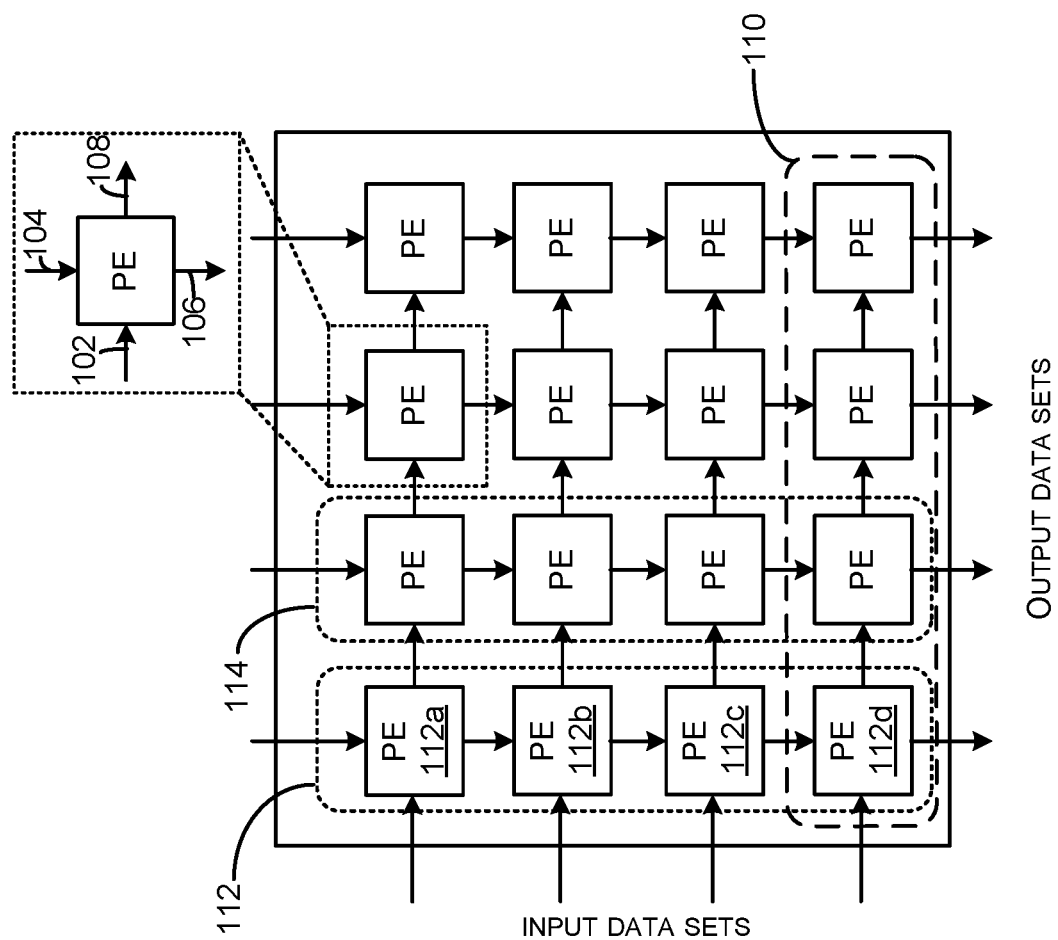
FIG. 1 illustrates an example 4×4 systolic array.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A convolutional neural network (CNN) is generally a feed-forward artificial neural network, which may include multiple intermediate layers and an output from one layer may be used as an input to the next layer. Systolic arrays may be used to accelerate the workload in neural networks by reading the data from the memory once, and reusing it in multiple computations. A systolic array may be implemented using a two-dimensional array of processing elements (PEs). The PEs can be divided into layers including, e.g., an input layer, a number of intermediate layers (also known as hidden layers), and an output layer. Each PE of the input layer may receive an element of an input data set, and scale the element with a weight (or a filter) to indicate the element's degree of influence on the output. The PEs in the intermediate layers may combine the scaled elements received from each PE of the input layer to compute a set of intermediate outputs. For example, each PE in the intermediate layers may compute a sum of the element-weight products, and then generate an intermediate output by applying an activation function to the sum. The intermediate outputs from each PE of one intermediate layer may be considered as an activated vote (or no-vote), associated with a weight indicating the vote's influence, to determine the intermediate output of the next intermediate layer. The output layer may generate a sum of the scaled intermediate outputs from the final intermediate layer, and generate a binary output (e.g., "yes" or "no") based on whether the sum of the scaled intermediate outputs exceeds a threshold.

Generally, an input data set (e.g., an input feature map) may be fed, one input data element at a time, into its respective row of the systolic array, and passed from one PE to another PE in a given row starting from a leftmost PE. In some implementations, the weights may be cached in the respective PEs. As the input data element passes through a PE, the input data element can be multiplied with the cached weight value, and accumulated with a partial sum provided by a neighboring PE in a row above. In most implementations, the systolic array may include a large number of PEs (e.g., several thousands), therefore dynamic power consumption can become critical due to the multiply-accumulate operations performed by the large numbers of PEs in the systolic array concurrently.

A common CNN may generally have several weights as well as input data elements with a value of zero. Additionally, a number of data elements generated by the intermediate layers may include a zero value due to the commonly used activation functions such as ReLu or Sigmoid. In these cases, the multiplication operation may generate a zero result due to multiplication with a zero value. The zero result accumulated with a partial sum may not alter the functional result, however, the multiply-accumulate operation may waste dynamic power since the multiplication operation is still being performed.

Embodiments of the disclosed technologies can provide systems and methods to reduce dynamic power consumption in a systolic array by skipping multiplication operations in a PE under certain conditions. The multiplication operation can be skipped when a zero is detected on an input data element for a current operation or a no-operation (NOP) is received by a PE. For example, each PE may receive an opcode indicating an operation to be executed by the PE. The PE may decode the opcode to determine if the opcode value corresponds to a NOP. According to certain embodiments, a value of zero on an input data element may be detected by respective zero input data detector circuits for each row of the systolic array as the input data element enters the systolic array. A value of zero may correspond to a logical zero or a logical low, and a value of one may correspond to a logical one or a logical high. For example, in some implementations, the logical zero may be represented by a first range of voltage levels (e.g., 0-2 volts), and the logical one may be represented by a second range of voltage levels (e.g., 3-5 volts). The respective zero input data detector circuits may generate a zero input data indicator signal for each row, which may be sequentially passed to all the PEs in that row. A respective weight value may be pre-loaded in each PE of the systolic array. For each row of the systolic array, a respective zero weight detector circuit may be used to detect a value of zero on each weight value entering the respective row and generate a respective zero weight indicator signal for each weight value. The respective zero weight indicator signals may be sequentially passed to subsequent PEs in each row along with a corresponding weight value and may be cached in a respective PE for each column. Thus, instead of having respective zero detector circuits in each PE, embodiments of the disclosed technologies can reduce the gate count and dynamic power consumption by having the zero detector circuits that are external to the PEs, and can be used by all the PEs in a given row.

The zero input data indicator and an opcode indicating a NOP may be used to gate a register in each PE, which stores the input data element. Thus when a zero input data indicator is asserted indicating that an input data element associated with the zero input data indicator is "0", or the opcode indicates a NOP, the register may hold the previous value of the input data element. Stored value of the input data element may be sequentially passed to other PEs in that row along with the respective zero input data indicator signal. However, a zero value of the input data element may not be stored in the register, and therefore not passed to other PEs in that row. The respective stored value of the input data element may be used by a multiplier in each PE to perform the multiplication operation with a weight value cached in the respective PE. When the zero input data indicator corresponding to an input data element is asserted or the opcode indicates a NOP, the stored value of the input data element may not toggle. Since the weight may already be pre-loaded in the PE, the inputs to the multiplier may not change, and the multiplication operation may be skipped, thus reducing the dynamic power consumption by the PE for that operation. In such cases, the multiply-accumulate operation may not provide a correct result, therefore, the result of the multiply-accumulate operation may be bypassed, and an input partial sum from a neighboring PE in a row above may be provided as an output partial sum to another neighboring PE in a row below. An example systolic array is explained with reference to FIG. 1.

FIG. 1 illustrates an example 4×4 systolic array 100. For example, the systolic array 100 may include four PEs in each row, and four PEs in each column. It will be understood that the systolic array 100 may include any number of PEs in each row and column. The systolic array 100 may be part of a neural network processor in a computer system. For example, the computer system may be configured to provide multi-tenant compute services for data processing applications such as an image recognition service, text-based data processing (e.g., processing of search queries), audio or video data processing, etc.

Each PE may include a row input bus 102, a column input bus 104, a column output bus 106, and a row output bus 108. A PE may receive inputs from a left PE of the same row (or from external circuitries) via the row input bus 102. The PE may also receive inputs from a PE of the same column above (or from external circuitries) via the column input bus 104. The PE may perform arithmetic computations based on the inputs, and transmit the result of the arithmetic computations to a PE of the same column below (or to the external circuitries) via the column output bus 106. The PE may also forward the inputs received via the row input bus 102 to a right PE of the same row via the row output bus 108.

The systolic array 100 may be configured to perform the arithmetic computations, including multiplication and addition operations, for the processing elements of a neural network. For example, each PE may include arithmetic units such as a multiplier and an adder, or a fused multiplier adder.

In the example of FIG. 1, each row of the PEs may be configured to handle one set of input data, and each column of the PEs may generate one set of output data based on the sets of input data received by each PE in a given column.

In one implementation, a column 112 of the PEs (the leftmost column) may receive four sets of input data, with each set of input data being handled by one row of the PEs. Each PE in the column 112 may obtain, from the corresponding input data set received via the row input bus 102, an input data element and an associated weight value, and multiply the input data element with the weight value to generate a scaled input. The scaled inputs generated by the PEs within any column (including the column 112) can be accumulated by the adder of each PE. For example, a PE 112a (of the column 112) may generate a first scaled input (from the first input data set), and transmit the first scaled input to a PE 112b via the column output bus 106 as a partial sum. The PE 112b may also generate a second scaled input (from the second input data set) and add the second scaled input to the partial sum. The updated partial sum, accumulated with the first scaled input and the second scaled input, is then transmitted to a PE 112c via the column output bus 106. The partial sums are updated and propagated across the column 112, and a PE 112d may generate a sum of the scaled inputs from the four input data sets.

The sum generated by the PE 112d may correspond to an output data set, and may be fed back to the leftmost PEs after going through an activation function. Moreover, each PE in the column 112 can also propagate the input data sets to other PE columns (e.g., a column 114), which can scale the input data sets with a different set of weights from the column 112. Each column of the PEs can perform the arithmetic operations (multiplications and summations) to generate the output data elements for other processing elements in parallel. In the example of FIG. 1, the systolic array 100 can generate output data elements for four PEs corresponding to the four columns of the systolic array 100.

The systolic array 100 may perform convolution computations in multiple waves. A wave may be defined as streaming of input data elements while reusing the same weights in the systolic array 100. For example, the respective weights may have been pre-loaded in each PE in the systolic array 100, sequentially or in parallel prior to starting a wave computation. The partial sums generated by the PEs may correspond to a single wave. As the PEs of the systolic array 100 perform arithmetic operations for the convolution computations, dynamic power dissipated by all the multipliers in the PEs may be significant. This problem may be further exacerbated for a systolic array comprising a large number of PEs (e.g., several thousands). The arithmetic operations performed by a PE are further explained with reference to FIG. 2.

Figure 2:
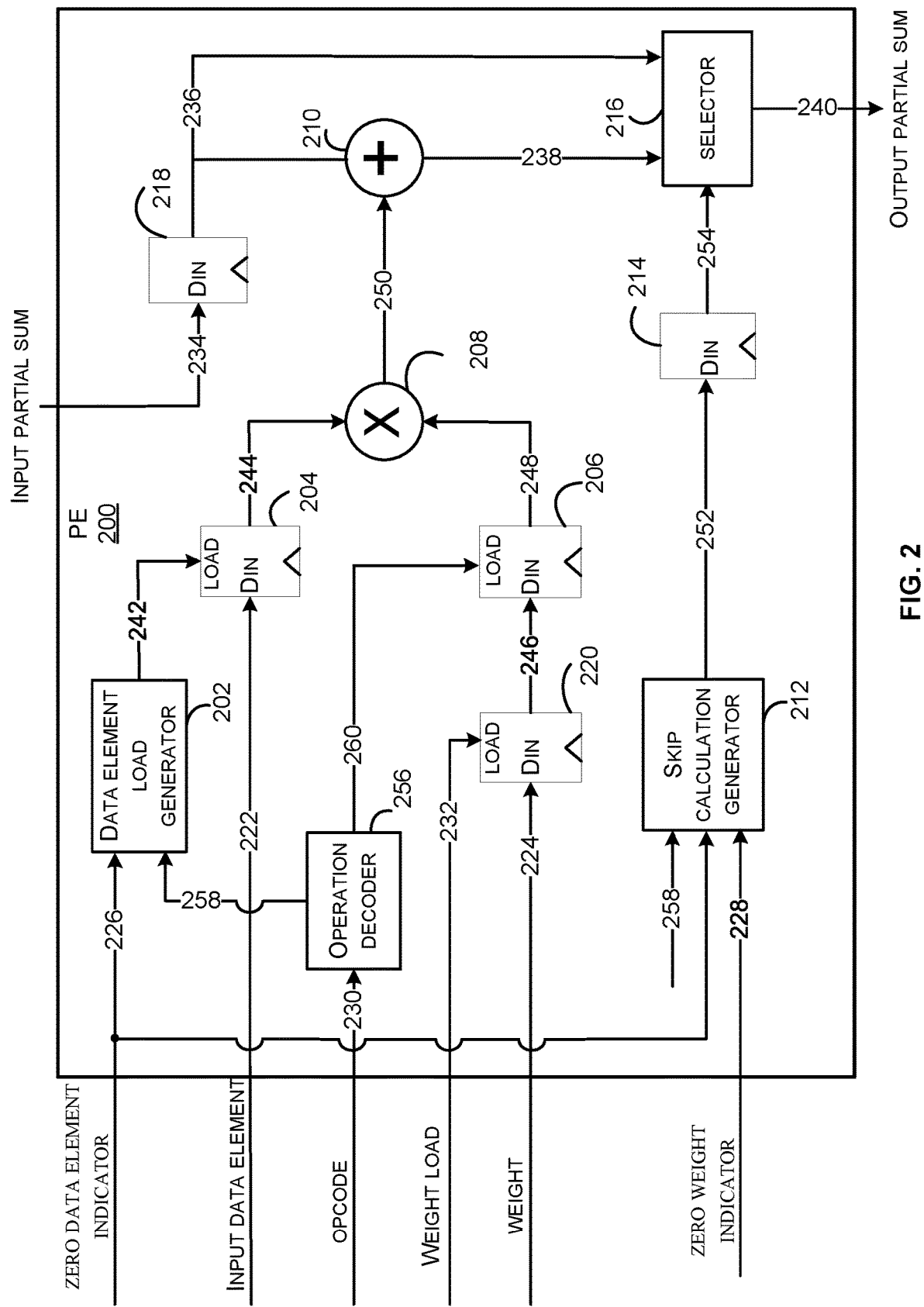
FIG. 2 illustrates a processing element for neural network computations, according to certain embodiments of the disclosed technologies.

FIG. 2 illustrates a PE 200 for neural network computations, according to certain embodiments of the disclosed technologies. The PE 200 may be part of a systolic array similar to the systolic array 100 in FIG. 1. Some embodiments may be described with reference to neural networks, however it will be understood that certain embodiments may be used in other applications, e.g., pattern recognition, image processing, audio processing, video processing, etc., without deviating from the scope of the technologies.

The PE 200 may include a data element load generator 202, a data register 204, a weight register 206, a multiplier 208, an adder 210, a skip calculation generator 212, a skip calculation register 214, a selector 216, an input partial sum register 218, a cached weight register 220, and an operation decoder 256. The PE 200 may be configured to receive an input data element 222, a weight 224, a zero data element indicator 226, a zero weight indicator 228, an opcode 230, a weight load signal 232, and an input partial sum 234 to perform the convolution computations according to some embodiments.

The PE 200 may be configured to receive the input data element 222 via a first port. The input data element 222 may correspond to an input data set, or any array of input data elements. The PE 200 may receive one input data element at a time, in uniform time periods, from the input dataset. For example, a uniform time period may correspond to a clock cycle. The input data set may be similar to an input feature map comprising input feature map elements. As an example, the input data set may correspond to an input image, an audio clip, a video clip, a text portion, or any other data which may be provided for data processing to identify a certain pattern or an object. In some instances, the input data set may correspond to an intermediate output dataset, which has gone through an activation function, e.g., ReLu or Sigmoid, as discussed with reference to FIG. 1. Each input data element 222 may include 8-bits, 16-bits, or any suitable number of bits.

The PE 200 may be configured to receive the weight 224 via a second port. In some implementations, the weight 224 may belong to a set of weight values corresponding to a convolution filter. The weight 224 may be pre-loaded in the PE 200 prior to receiving the input data element 222. In some embodiments, the PE 200 may receive one weight value at a time, in the uniform time periods, from the set of weight values, to pre-load each PE in a given row with a respective weight value. The PE may pass the weight value to the next PE in the respective row until each PE in the given row has been pre-loaded. Each PE may cache the respective weight value to use for computations with the input data elements. The weight values in the convolution filter may have been pre-determined based on supervised learning, unsupervised learning, or any other method suitable for determining convolutional filters. For example, given an input image, the weight values in the convolution filter can represent a spatial distribution of pixels for certain features to be detected from the input image. The weight 224 may include 8-bits, 16-bits, or any suitable number of bits.

The PE 200 may be configured to receive the zero data element indicator 226 for a current operation via a third port. The zero data element indicator 226 may include a single bit or multiple bits. The zero data element indicator 226 may be used to indicate whether the input data element 222 associated with the zero data element indicator 226 is zero. For example, a value of "1" for the zero data element indicator 226 may indicate that the input data element 222 associated with the zero data element indicator 226 is zero, and a value of "0" for the zero data element indicator 226 may indicate that the input data element 222 associated with the zero data element indicator 226 is not zero. A "0" may correspond to a logical zero or a logical low, and a "1" may correspond to a logical one or a logical high. For example, in some implementations, the logical zero may be represented by a first range of voltage levels (e.g., 0-2 volts), and the logical one may be represented by a second range of voltage levels (e.g., 3-5 volts). It will be understood that other implementations to represent a "0" value and a '1' value are possible without deviating from the scope of the disclosed technologies. The zero data element indicator 226 may be generated by a circuit external to the PE 200, and passed to all the PEs in the same row sequentially, in the uniform time periods.

The PE 200 may be configured to receive the zero weight indicator 228 via a fourth port. The zero weight indicator 228 may include a single bit or multiple bits. The zero weight indicator 228 may be used to indicate whether the weight 224 associated with the zero weight indicator 228 is zero. For example, a value of "1" for the zero weight indicator 228 may indicate that the weight 224 is zero, and a value of "0" for the zero weight indicator 228 may indicate that the weight 224 is not zero. The zero weight indicator 228 may be generated by a circuit external to the PE 200, and passed to all the PEs in the same row sequentially along with the weight 224.

The weight load signal 232 may be used to load the weight 224 into the cached weight register 220 to provide a cached weight 246. The weight load signal 232 may be asserted to cache the weight 224 for the PE 200 in the cached weight register 220 before the input data element 222 is fed into the array. As the weights are shifted into the array to pre-load each PE with a respective weight value, the weight load signal 232 may be asserted for each PE at certain time periods in order to pre-load each PE with the appropriate weight value.

The operation decoder 256 may be configured to decode the opcode 230 to determine an operation to be executed by the PE 200 for different instructions represented by different opcode values. In some embodiments, a first opcode value may correspond to an instruction to shift the weights from one PE to another in the systolic array. A second opcode value may correspond to an instruction to start the arithmetic computations by the PE. For example, once the weights have been pre-loaded in the systolic arrays, the input data elements may be read from the memory and the arithmetic computations may be performed as the input data elements pass through the array. A third opcode value may correspond to an instruction to execute NOPs. The NOPS may be used to space two systolic array instructions, or when there are no input data elements to be read from the memory. For example, the NOPs may be used to space the instructions to shift the weights, and the instructions to start the arithmetic computations. For example, for a 4×4 array, it may take up to 15 cycles to shift the weights into all the PEs in the array before starting the arithmetic computations so 15 NOP cycles may be needed. The operation decoder 256 may be configured to decode the opcode 230 to generate a NOP 258, and a start computations signal 260. The opcode 230 may include any suitable number of bits, e.g., two, four, etc.

In some implementations, the input data element 222, the weight 224, the opcode 230, the zero data element indicator 226, and the zero weight indicator 228 may belong to the row input bus 102, as discussed with reference to FIG. 1. The row input bus 102 may also include one or more control signals, e.g., a data type. In some implementations, a splitter (not shown) may be used in the PE 200 to split the row input bus 102 into different internal buses to carry the input data element 222, the weight 224, the opcode 230, the zero data element indicator 226, and the zero weight indicator 228 within the PE 200.

The data element load generator 202 may be configured to generate a data load signal 242 that may be used to allow the data register 204 to skip storing of the input data element 222 in certain conditions. In some embodiments, the input data element 222 may be loaded into the data register 204 when the data load signal 242 is asserted based on the zero data element indicator 226 and the NOP 258. The data load signal 242 may be asserted when the zero data element indicator 226 corresponding to the input data element 222 is "0" and the opcode 230 does not indicate a NOP (e.g., the NOP 258 is "0"). The data load signal 242 may not be asserted when the zero data element indicator 226 corresponding to the input data element 222 or the NOP 258 is "1." The data element load generator 202 may be implemented using an OR, NOR, NAND, or any suitable circuit.

The data register 204 may be configured to store the input data element 222, or skip storing of the input data element 222 to provide a stored input data element 244 based on the data load signal 242 for a current operation. In some implementations, the data register 204 may store a Din input if a load input is "1", and may hold the previous value if the load input is "0." For example, if the data load signal 242 is "1", the data register 204 may store a new value for the input data element 222, and if the data load signal 242 is "0", the data register 204 may skip storing the new value for the input data element 222. Thus, in some instances, the data register 204 may only store non-zero value of the input data element 222. According to certain embodiments, skipping the storing of the new value by the data register 204 may result in not toggling the stored input data element 244 and holding the previous value of the stored input data element 244.

The weight register 206 may be configured to store the cached weight 246 to provide a stored weight value 248 based on the start computations signal 260. In some implementations, the weight register 206 may store a Din input if a load input is "1", and may hold the previous value if the load input is "0." For example, if the start computations signal 260 is asserted (e.g., the start computations signal 260 is "1"), the cached weight 246 may be loaded into the weight register 206, else the weight register 206 may hold the previous value. Thus, the weight 224 previously loaded into the cache register 220 using the weight load signal 232 may be shifted into the weight register 206 at the start of the arithmetic computations. In some embodiments, the stored weight value 248, once loaded at the start of the arithmetic computations, remains unchanged as the input data element is fed into the PE 200, one element at a time, for computations corresponding to one or more waves through the systolic array.

The multiplier 208 may be configured to perform a multiplication operation between the stored input data element 244 and the stored weight value 248 to provide a multiplication result 250. The multiplier 208 may be implemented using a multiplier circuit. Generally, when there is a change in the value of any of the inputs of the multiplier 208 (e.g., a "1" to "0", or vice-versa), the multiplier 208 performs the multiplication operation, and the output of the multiplier 208 changes resulting in dynamic power dissipation. For a systolic array comprising hundreds or thousands of PEs similar to the PE 200, the power consumption can be substantial. According to certain embodiments, power consumption of the PE 200 can be reduced by avoiding the toggling of all the inputs to the multiplier 208 under certain conditions so that the multiplication operation can be skipped altogether. In some implementations, when the zero data element indicator 226 or the NOP 258 is asserted, storing of the input data element 222 in the data register 204 can be skipped using the data load signal 242, thus keeping the stored input data element 244 input going into the multiplier 208 unchanged. For example, the zero data element indicator 226 or the NOP 258 may generate a value of "0" for the data load signal 242, which can disable loading of the input data element 222 into the data register 204. Since the weight 224 has been pre-loaded into the PE 200, input to the weight register 206 may not change even if the cached weight 246 is zero. Therefore, the stored weight value 248 may not change as the input data element 222 is received by the PE 200 for the current operation. In this case, the stored input data element 244 and the stored weight value 248 may hold their values from the previous operation and may not toggle. Thus, the multiplication result 250 may not change and the dynamic power consumption can be reduced. Since the multiplication result 250 may not be accurate for the current operation, the multiplication result 250 is not propagated to other PEs in the array.

The PE 200 may be configured to receive the input partial sum 234 via a fifth port. The input partial sum 234 may be a partial sum generated from a neighboring PE in a row above and in the same column of the systolic array. In some instances, the input partial sum 234 may include inputs from external circuitries. For example, when the PE 200 is a PE in a first row of the systolic array, the input partial sum 234 may include default values. As discussed with reference to FIG. 1, the input partial sum 234 may be part of the column input bus 104. In some instances, the column input bus 104 may also be used to load weights in the PE 200. The column input bus 104 may also include control signals, e.g., an overflow bit. In some implementations, the opcode 230 may be provided to the PE 200 via the column input bus 104. The input partial sum 234 may be stored in an input partial sum register 218 to provide a stored input partial sum 236.

The adder 210 may be configured to perform an addition operation on the multiplication result 250 and the stored input partial sum 236 to provide an addition result 238. The adder 210 may be implemented using an adder circuit. In some embodiments, the multiplication and addition operations may be fused or integrated together to perform a single step multiply add operation with a single rounding using a fused multiplier adder, or fused multiplier accumulator instead of performing multiplication and addition operations in different steps. The fused multiplier adders may be used to improve the speed and accuracy of the floating point arithmetic operations. For example, in place of the multiplier 208 and the adder 210, a fused multiplier adder (FMA) may be used to perform both the multiplication and addition operations in a single step.

The skip calculation generator 212 may be configured to generate a skip calculation indicator 252 which may be used to bypass the multiplication result 250 under certain conditions. For example, when a zero is detected on the input data element 222 or the weight 224, or the opcode 230 indicates a NOP, the multiplier result 250 may be inaccurate for the current operation and may need to be bypassed based on the NOP 258, the zero data element indicator 226 and the zero weight indicator 228. In some embodiments, the skip calculation generator 212 may assert the skip calculation indicator 252 to "1", when the NOP 258, the zero data element indicator 226 or the zero weight indicator 228 is "1." The skip calculation generator 212 may use OR, NOR, NAND or other suitable circuits to generate the skip calculation indicator 252. The skip calculation indicator 252 may be stored in a skip calculation register 214 to provide a stored skip calculation indicator 254 that may be used by the selector 216.

The selector 216 may be configured to select either the addition result 238 or the stored input partial sum 236 based on the stored skip calculation indicator 254 to provide an output partial sum 240 via a sixth port. According to some embodiments, when a value of either the input data element 222 or the weight 224 for a current operation is zero, or the NOP 258 is asserted, the addition result 238 may not provide a correct result for the current operation since the multiplication result 250 may hold a value for the previous operation. In such cases, the stored skip calculation indicator 254 may allow bypassing the addition result 238, and selecting the stored input partial sum 236 to provide the output partial sum 240. For example, when the stored skip calculation indicator 254 is "1", the stored input partial sum 236 may be selected as the output partial sum 240, and when the stored skip calculation indicator 254 is "0", the addition result 238 may be selected as the output partial sum 240. The selector 216 may be implemented using a multiplexer, or any suitable circuit.

According to certain embodiments, when the input data element 222, or the weight 224 is zero, selecting the input partial sum 236 as the output partial sum 240 based on the stored skip calculation indicator 254 can provide the same functionality as adding a zero multiplication result 250 to the stored input partial sum 236 by the adder 210. Thus, bypassing the output of the adder 210 may not result in any change in the functionality of the PE 200 to perform convolution computations. Generation of the zero data element indicator 226 and the zero weight indicator 228 for each row of an array is discussed with reference to FIG. 3.

Figure 3:
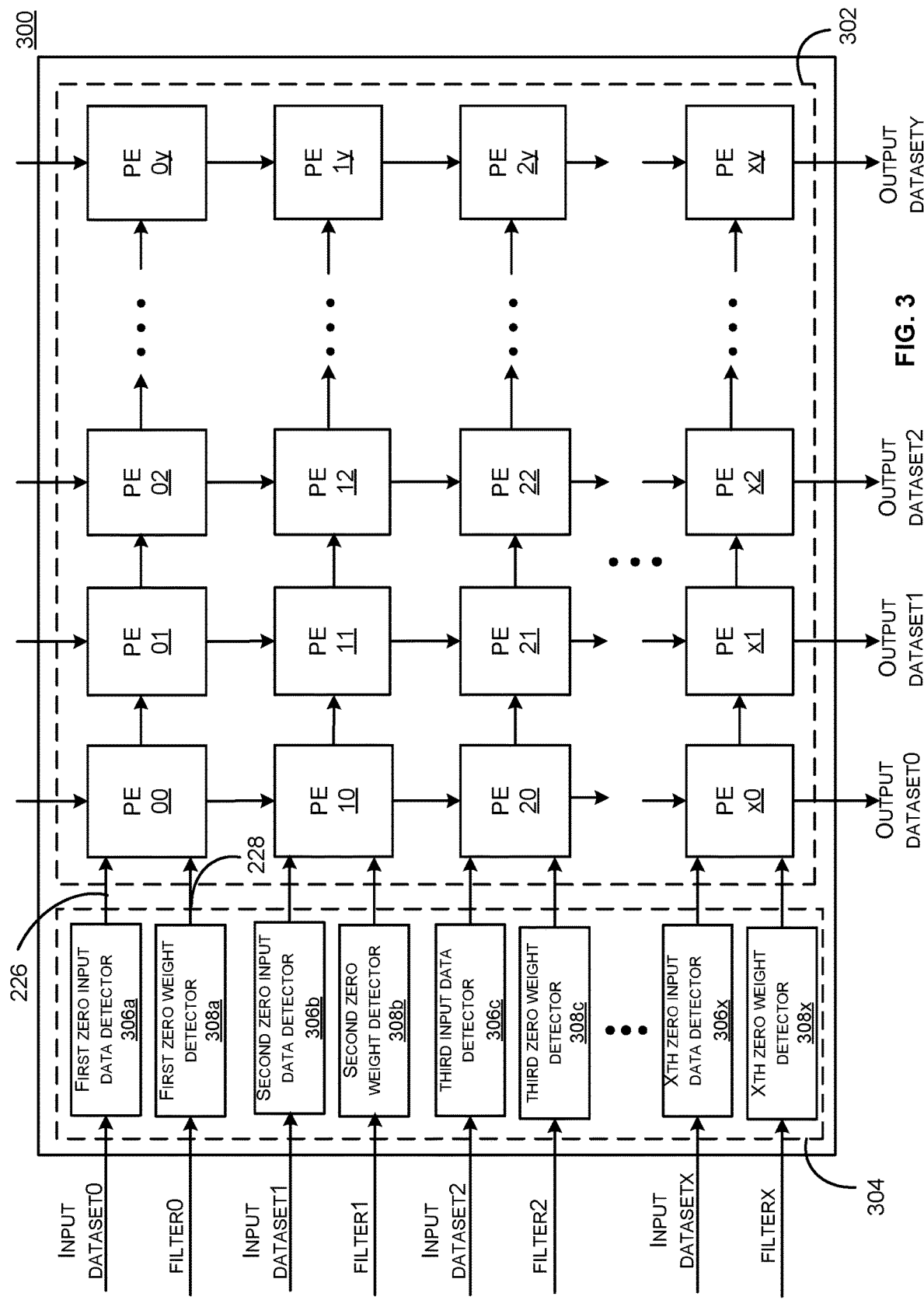
FIG. 3 illustrates an apparatus including zero detector circuits for input data elements and weights entering a systolic array for neural network computations, according to certain embodiments of the disclosed technologies.

FIG. 3 illustrates an apparatus 300 including zero detector circuits for input data elements and weights entering a systolic array for neural network computations, according to certain embodiments of the disclosed technologies.

The apparatus 300 may include a two-dimensional systolic array 302 comprising PEs arranged into rows and columns. The systolic array 302 may be similar to the systolic array 100 in FIG. 1. A first row of the systolic array 302 may include PE 00, PE 01, PE 02, . . . , PE 0y, a second row of the systolic array 302 may include PE 10, PE 11, PE 12, . . . , PE 1y, a third row of the systolic array 302 may include PE 20, PE 21, PE 22, . . . , PE 2y, and an Xth row of the systolic array 302 may include PE x0, PE x1, PE x2, . . . , PE xy. The x and y may include positive integers, e.g., 32, 64, 128, or any suitable number. Each PE of the systolic array 302 may be similar to the PE 200, and include means to perform arithmetic computations using power efficient methods, as discussed with reference to FIG. 2.

In certain embodiments, a first (e.g., leftmost) PE in each row of the systolic array 302 may be coupled to a respective zero input data detector circuit to detect a zero value on an input data element, and a respective zero weight detector circuit to detect a zero value on a weight value entering the systolic array 302. For example, the PE 00 in the first row may be coupled to a first zero input data detector 306a and a first zero weight detector 308a, the PE 10 in the second row may be coupled to a second zero input data detector 306b and a second zero weight detector 308b, the PE 20 in the third row may be coupled to a third zero input data detector 306c and a third zero weight detector 308c, and the PE x0 in the Xth row may be coupled to an Xth zero input data detector 306x and an Xth zero weight detector 308x. The first zero input data detector 306a, the second zero input data detector 306b, the third zero input data detector 306c, . . . , and the Xth zero input data detector 306x may be configured to detect a zero value on a respective input data element in an input dataset0, an input dataset1, an input dataset2, . . . , and an input datasetx respectively. Similarly, the first zero weight detector 308a, the second zero weight detector 308b, the third zero weight detector 308c, . . . , and the Xth zero weight detector 308x may be configured to detect a zero value on a respective weight value in a filter0, a filter1, a filter2, . . . , and a filterx respectively.

Each of the input dataset0, the input dataset1, the input dataset2, . . . , and the input datasetx may belong to an image, a text, a video clip, an audio clip, or another type of data set which may need to be processed by a neural network processor for convolution computations. In some instances, the input dataset0, the input dataset1, the input dataset2, . . . , and the input datasetx may be associated with output dataset0, output dataset1, output dataset2, . . . , output datasety generated by an intermediate layer of the convolution operation. For example, the output dataset0, output dataset1, output dataset2, . . . , output datasety may go through activation functions and fed back to the systolic array 302 as the input dataset0, the input dataset1, the input dataset2, . . . , and the input datasetx. The filter0, the filter1, the filter2, . . . , and the filterx may include different sets of weight values to convolve with the input dataset0, the input dataset1, the input dataset2, . . . , and the input datasetx. The weight values in the filter0, the filter1, the filter2, . . . , and the filterx may be pre-determined using supervised learning, non-supervised learning, or any suitable method of determining convolution filters.

Each zero input data detector for the respective row may be configured to detect whether an input data element from the input dataset entering the respective row is "0" and generate a corresponding zero input data indicator for that input data element. The corresponding zero data element indicator may be passed into the first PE of the respective row along with the input data element. For example, the PE 00 may be the first PE of the first row in the systolic array 302. The PE 00 may be configured to receive input data elements from the input dataset0 prior to other PEs in the first row (e.g., PE 01, PE 02, . . . , PE 0y). In some embodiments, one input data element at a time may be fed sequentially, in uniform time periods, from the input dataset0 to the PE 00. The first zero input data detector 306a may be configured to generate the corresponding zero data element indicator 226 in each of the uniform time periods (e.g. clock cycles) for each input data element from the input dataset0. The zero data element indicator 226 corresponding to each input data element may be fed to the PE 00 sequentially, in uniform time periods, along with each input data element. The PE 00 may store or skip storing the received input data element 222 based on the value of the respective data load signal 242. In some implementations, the first zero input data detector 306a may include a comparator to compare the incoming input data element with a zero to assert (e.g., set to "1") or de-assert (e.g., set to "0") the zero data element indicator 226 based on the value of the incoming input data element. For example, the comparator may be implemented using an OR, XOR, NAND, or any suitable circuit.

Each zero weight detector for the respective row may be configured to detect whether a weight value from a set of weight values entering the respective row is zero and generate a corresponding zero weight indicator for that weight value. For example, the first zero weight detector 308a may be configured to detect whether a weight value from the filter0 (e.g., the weight 224) includes a zero value and generate the corresponding zero weight indicator 228 for the weight. In some implementations, the first zero weight detector 308a may include a comparator to compare the weight value with a zero to assert (e.g., set to "1") or de-assert (e.g., set to "0") the zero weight indicator 228. For example, the comparator may be implemented using an OR, XOR, NAND, or any suitable circuit. In one embodiment, one weight value at a time may be fed sequentially, in uniform time periods, from the filter0 to the PE 00 for pre-loading the respective weight values in the PE 00 to the PE 0y prior to starting the arithmetic computations. The first zero weight detector 308a may generate a corresponding zero weight indicator for each of those weight values which may be fed to the PE 00 sequentially, in uniform time periods, along with the corresponding weight value. The PE 00 may pass the respective weight values and the corresponding zero weight indicators sequentially to the next neighboring PE until all the PEs in the first row have been preloaded with the respective weight values and the corresponding zero weight indicators. The respective weight value and the corresponding zero weight indicator may be cached in each PE before the respective input data elements are fed to each row in the systolic array 302.

The second zero input data detector 306b, the third zero input data detector 306c, . . . and the Xth zero input data detector 306x may be similar to the first zero input data detector 306a, and may generate a respective zero data element indicator, similar to the zero data element indicator 226, to provide to the PE 10, PE 20, . . . , and PE x0 sequentially, in the uniform time periods, for power optimization. The respective zero data element indicator generated for each row may be received by a respective first PE in each row via the respective row input bus 102, and propagated, sequentially, in the uniform time periods, by the first PE to all the PEs in the given row. The second zero weight detector 308b, the third zero weight detector 308c, . . . , and the Xth zero weight detector 308x may be similar to the first zero weight detector 308a, and may generate a respective zero weight indicator, similar to the zero weight indicator 228, to provide to the PE 10, PE 20, . . . , and PE x0, sequentially, to pre-load each PE in the respective row along with the respective weight value prior to starting the arithmetic computations.

In some embodiments, the zero input data detectors 306a-306x, and the zero weight detectors 308a-308x may be implemented as a separate entity external to the systolic array 302. For example, the zero input data detectors 306a-306x, and the zero weight detectors 308a-308x may be part of a circuit 304. In other embodiments, the circuit 304 and the systolic array 302 may be part of a computing engine, which may be configured to perform arithmetic computations for the convolution operations. Some embodiments of the disclosed technologies can provide reduced gate count and dynamic power consumption by detecting zeros on the input data elements and the weights entering a respective first PE in each row of the systolic array, and passing the zero indicators to all the PEs in the array as compared to using respective zero detectors within each PE in the systolic array 302.

Note that FIG. 3 only shows the respective zero data element indicator and the zero weight indicator entering the first PE in each row of the systolic array 302 for ease of illustration, however it will be understood that each PE in the respective row of the systolic array 302 may also receive the respective input data element and the respective weight value along with some control signals (e.g., opcode 230, weight load 232, data type, etc.), which may be propagated from the left to the right of the systolic array 302 for each row. This is further explained with reference to FIG. 4.

Figure 4:
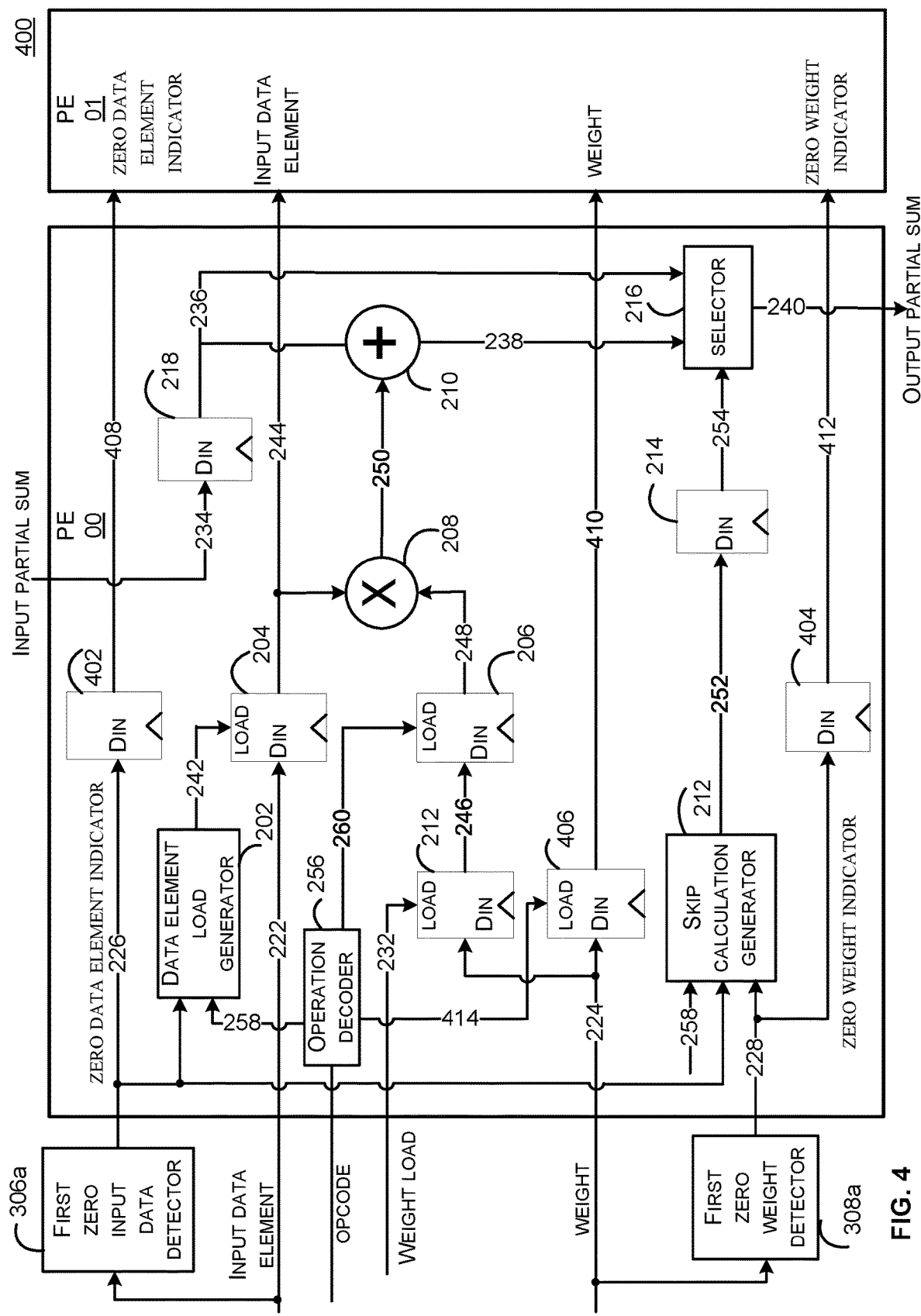
FIG. 4 illustrates an apparatus showing propagation of zero detectors, the input data element and the weight value from one processing element to another, according to a first embodiment of the disclosed technologies.

FIG. 4 illustrates an apparatus 400 showing propagation of zero indicators, the input data element and the weight value from one PE to another, according to a first embodiment of the disclosed technologies.

In some embodiments, each PE of the systolic array 302 may include components, in addition to the components of the PE 200 as shown in FIG. 2, to cache the weight, and the zero indicators before passing them to a neighboring PE in a given row. For example, each PE may include a zero data element indicator register 402, a zero weight indicator register 404, and an output weight register 406, in addition to the components of the PE 200. This is further explained in FIG. 4 using the PE 00 and the PE 01 as an example. The PE 00 and the PE 01 are part of the systolic array 302 as discussed with reference to FIG. 3.

The zero data element indicator register 402 may be configured to store the zero data element indicator 226 received by the PE 00 to provide a stored zero data element indicator 408. The zero data element indicator 226 may correspond to the input data element 222 received by the PE 00. As discussed with reference to FIG. 3, one input data element at a time may be fed sequentially, in uniform time periods, from the input dataset0 to the PE 00. The data register 204 may store or skip storing the input data element 222 for a current operation based on the data load signal 242. For example, if the zero data element indicator 226 is "1" or the NOP 258 is received by the PE 00 for the current operation, the data register 204 may hold the value from the previous operation or a default value. The stored input data element 244 may be provided to the PE 01 as the input data element 222.

Thus, in certain embodiments, if a zero is detected on the input data element 222 received by the PE 00 for the current operation, the zero value of the input data element 222 may not be propagated to the PE 01-PE 0y since the stored input data element 244 may hold the value from the previous operation or the default value. However, the stored zero data element indicator 408 corresponding to the zero value of the input data element 222 may be propagated to the neighboring PEs. The PE 01 may receive the stored zero data element indicator 408 as the zero data element indicator 226, store it, and propagate its stored zero data element indicator 408 to the neighboring PE (e.g., PE 02). The PE 01 may also propagate its stored input data element 244 from the previous operation to PE 02 along with the stored zero data element indicator 408. Thus, the zero data element indicator 226 may only be generated once by the first zero input data detector 306a, and passed sequentially, in uniform time periods, from the PE 00 to the PE 0y. The respective stored zero data element indicator 408 in each PE may be used to bypass the respective multiplier result 250 in each PE if the corresponding input data element 222 includes a zero value. Thus, the respective output partial sum 240 in each PE may be the respective input partial sum 234 if the respective input data element 222 or the respective weight 224 includes a zero value or a NOP is received for that operation.

The zero weight indicator register 404 may be configured to store the zero weight indicator 228 received by the PE 00 to provide a stored zero weight indicator 412. The zero weight indicator 228 may correspond to the weight 224 received by the PE 00. The PE 00 may be configured to receive the weight 224 for pre-loading the weights in the systolic array 302 prior to starting the arithmetic computations. For example, in one embodiment, one weight value at a time may be fed sequentially, in uniform time periods, from the filter0 to the PE 00. The PE 00 may store the received weight value in the output weight register 406 to provide a stored weight value 410 based on a shift weight signal 414. The stored weight value 410 may be shifted into the PE 01 as the weight 224. The shift weight signal 414 may be generated by the operation decoder 256 based on the opcode 230. For example, the opcode 230 may include a certain opcode value to indicate shifting of the weight value from one PE to another PE. The PE 01 may receive the stored zero weight indicator 412 as the zero weight indicator 228 in the next time period, store it, and propagate its stored zero weight indicator 412 to the neighboring PE (e.g., PE 02). Thus, the zero weight indicator 228 may only be generated once by the first zero weight detector 308a, and passed sequentially, in uniform time periods, from the PE 00 to the PE 0y along with the corresponding weight value.

In certain embodiments, the same weight value may be used by all the PEs in a given row for convolving with each input data element for an input data set to optimize the memory bandwidth. In some embodiments, instead of pre-loading the weights in the systolic array, respective weights may be fed into each row along with the input data elements to perform arithmetic computations. This is further explained with reference to FIG. 5.

Figure 5:
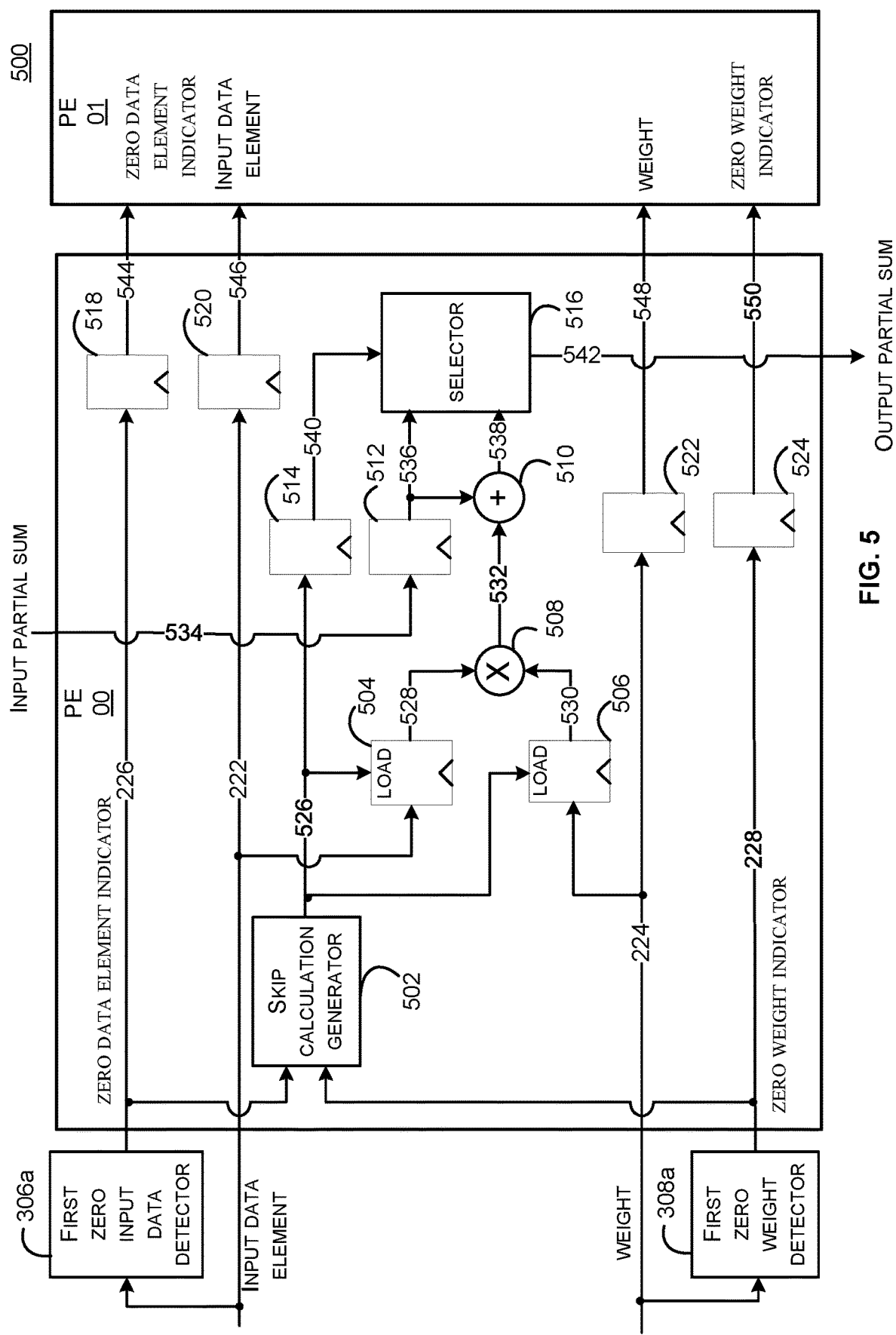
FIG. 5 illustrates an apparatus showing propagation of zero detectors, the input data element and the weight value from one processing element to another, according to a second embodiment of the disclosed technologies.

FIG. 5 illustrates an apparatus 500 showing propagation of zero detectors, the input data element and the weight value from one PE to another, according to a second embodiment of the disclosed technologies.

In the second embodiment, instead of pre-loading the weights in the systolic array, one weight value at a time may be fed sequentially, in uniform time periods, from the filter0 to the PE 00, along with the input data element 222. The input data element 222 and the weight 224 may be cached in their respective registers only if no zero is detected on both the input data element 222 and the weight 224. Thus, the multiplier inputs may not toggle if a zero is detected on either the input data element 222 or the weight 224 resulting in reduced power consumption. The input data element 222 and the weight 224 may be propagated to the neighboring PEs along with the corresponding zero data element indicator 226 and the zero weight indicator 228.

In the second embodiment, a skip calculation generator 502 may be configured to generate a skip calculation indicator 526 using the zero data element indicator 226 and the zero weight indicator 228. The skip calculation indicator 526 may be used by a data register 504 and a weight register 506 to skip storing of a zero value on the input data element 222 or the weight 224 respectively for a current operation. In some embodiments, the skip calculation generator 502 may perform an OR, or an NOR operation on the zero data element indicator 226 and the zero weight indicator 228 to generate the skip calculation indicator 526. The skip calculation indicator 526 may be stored in a skip calculation register 514 to provide a stored skip calculation indicator 540 that may be used by a selector 516.

The data register 504 may be configured to store the input data element 222, or skip storing of the input data element 222 to provide a stored input data element 528 based on the skip calculation indicator 526 for a current operation. For example, if the skip calculation indicator 526 is "0", the data register 504 may store a new value for the input data element 222, and if the skip calculation indicator 526 is "1", the data register 504 may skip storing the new value for the input data element 222. According to certain embodiments, skipping the storing of the new value by the data register 504 may result in not toggling the stored input data element 528 and holding the previous value of the stored input data element 528.

The weight register 506 may be configured to store the weight 224, or skip storing of the weight 224 to provide a stored weight value 530 based on the skip calculation indicator 526 for the current operation. For example, if the skip calculation indicator 526 is "0", the weight register 506 may store a new value for the weight 224, and if the skip calculation indicator 526 is "1", the weight register 506 may skip storing the new value for the weight 224. According to certain embodiments, skipping the storing of the new value by the weight register 506 may result in not toggling the stored weight value 530 and holding the previous value of the stored weight value 530.

The multiplier 508 may be configured to perform a multiplication operation between the stored input data element 528 and the stored weight value 530 to provide a multiplication result 532. In some implementations, when a value of either the input data element 222, or the weight 224 for a current operation is zero, storing of both the input data element 222 and the weight 224 in the data register 504 and the weight register 506 respectively can be skipped using the skip calculation indicator 526. For example, the zero data element indicator 226 or the zero weight indicator 228 may generate a value of "1" for the skip calculation indicator 526, which can disable loading of the respective inputs into the data register 504 and the weight register 506. In this case, the stored input data element 528 and the stored weight value 530 may hold their values from the previous operation and may not toggle. Thus, the multiplication result 532 may not change and the dynamic power consumption can be reduced. Since the multiplication result 532 may not be accurate for the current operation, the multiplication result 532 is not propagated to other PEs in the array.

The PE 00 may receive an input partial sum 534, which may be stored in an input partial sum register 512 to provide a stored input partial sum 536. The adder 510 may be configured to perform an addition operation on the multiplication result 532 and the stored input partial sum 536 to provide an addition result 538. In some embodiments, in place of the multiplier 508 and the adder 510, an FMA may be used to perform both the multiplication and addition operations in a single step.

The selector 516 may be configured to select either the addition result 538 or the stored input partial sum 536 based on the stored skip calculation indicator 540 to provide an output partial sum 542 via a sixth port. According to some embodiments, when a value of either the input data element 222, or the weight 224 for a current operation is zero, the addition result 538 may not provide a correct result for the current operation since the multiplication result 532 may hold a value for the previous operation. In such cases, the stored skip calculation indicator 540 may allow bypassing the addition result 538, and selecting the stored input partial sum 536 to provide the output partial sum 542. For example, when the stored skip calculation indicator 540 is "1", the stored input partial sum 536 may be selected as the output partial sum 542, and when the stored skip calculation indicator 540 is "0", the addition result 538 may be selected as the output partial sum 542. The selector 516 may be implemented using a multiplexer, or any suitable circuit.

In some embodiments, generation of the skip calculation indicator 526 may also be based on a value of an operation to be executed by the PE 00 as determined by the opcode 230 (not shown in FIG. 5). For example, for a NOP, the data register 504 and the weight register 506 can hold their values from a previous operation using the skip calculation indicator 526, thus reducing power consumption. The selector 516 may select the stored input partial sum 536 as the output partial sum 542 instead of the addition result 538.

The zero data element indicator register 518 may be configured to store the received zero data element indicator 226 to provide a stored zero data element indicator 544 to the neighboring PE 01 in the first row in the next time period.

The zero weight indicator register 524 may be configured to store the received zero weight indicator 228 to provide a stored zero weight indicator 550 to the neighboring PE 01 in the first row in the next time period.

The output data register 520 may be configured to store the received input data element 222 to provide a delayed input data element 546 to the neighboring PE 01 in the first row in the next time period.

The output weight register 522 may be configured to store the received weight 224 to provide a delayed weight value 548 to the neighboring PE 01 in the first row in the next time period.

The stored zero data element indicator 544, the stored zero weight indicator 550, the delayed input data element 546, and the delayed weight value 548 may be provided to the PE 01 via the row output bus 108 as discussed with reference to FIG. 1. In some embodiments, the control signals received by the PE 00 from external circuitries may also be cached in the PE 00 and provided to the PE 01 via the row output bus 108. Thus, the respective input data element, weight value, zero data element indicator, and the zero weight indicator received by each PE every clock cycle may be cached in the respective PE, and the cached (delayed) values may be passed to the next neighboring PE in the next time period.

The stored zero data element indicator 544, the stored zero weight indicator 550, the delayed input data element 546, and the delayed weight value 548 may be received by the PE 01 as the zero data element indicator, the zero weight indicator, the input data element, and the weight respectively via the row input bus 102. The PE 01 may perform the arithmetic computations on the delayed input data element 546, and the delayed weight value 548 according to certain embodiments. The PE 01 may skip the multiplication operation if the delayed input data element 546, or the delayed weight value 548 includes a zero value based on the stored zero data element indicator 544 and the stored zero weight indicator 550, thus optimizing the dynamic power consumption of the PE 01. The PE 01 may store the stored zero data element indicator 544, the stored zero weight indicator 550, the delayed input data element 546, and the delayed weight value 548 in respective registers in the PE 01, and pass the delayed values to the neighboring PE 02 in the next time period.

Thus, the input dataset0 may be fed, one input data element every time period, into the first row of the systolic array 302, and passed sequentially from the PE 00 to the PE 0y. As the input data element 222 passes through a PE, the stored input data element 528 can be multiplied with the stored weight value 530, and accumulated with the stored input partial sum 536 by the adder 510. If either the input data element 222 or the weight 224 is zero, the inputs to the multiplier 508 may not change to reduce power consumption, and the stored input partial sum 536 may be provided as the output partial sum 542 via the column output bus 106. The output partial sum 542 of the PE 00 may be passed on as the input partial sum 534 for the neighboring PE 10 in the second row. The same operations may be repeated by each row of the systolic array 302 and corresponding output datasets may be generated.

Figure 6:
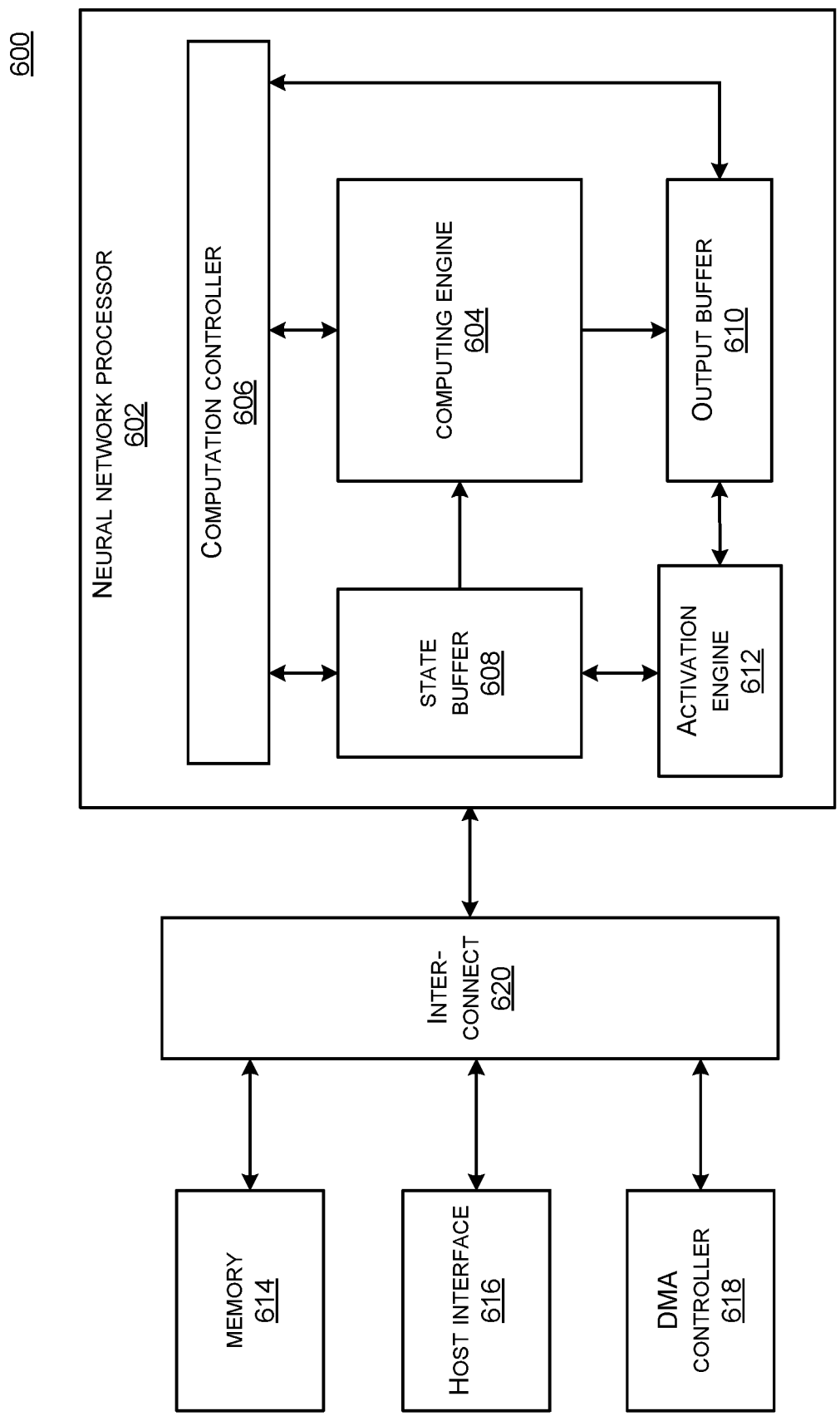
FIG. 6 shows an apparatus for neural network computations according to some embodiments of the disclosed technologies.

FIG. 6 shows an apparatus 600 for neural network computations according to some embodiments of the disclosed technologies. The apparatus 600 may be part of a computer system, e.g., a host server. For example, the host server may provide multi-tenant compute services for data processing applications such as an image recognition service, text-based data processing (e.g., processing of search queries), audio data processing, video data processing, etc. In some embodiments, a host device may operate a software application and communicate with the apparatus 600 to make a prediction based on computations with a prediction model utilizing a neural network processor. For example, the host device can make the prediction by identifying information included in an input data set for an image, text, audio, video, etc. using the prediction model.

The apparatus 600 may include a neural network processor 602 coupled to memory 614, a host interface 616, and a direct memory access (DMA) controller 618 via an interconnect 620. The neural network processor 602 may include a computing engine 604, a computation controller 606, a state buffer 608, an output buffer 610, and an activation engine 612. The neural network processor 602 can provide the computing resources to support the computations with the prediction model. The neural network processor 602 may be implemented as a system on chip (SoC), a field programmable gate array (FPGA), or any suitable circuit.

The memory 614 may be configured to store instructions, input data sets (e.g., pixel data of an image) and the weights (e.g., weights corresponding to certain visual and/or non-visual features) received from the host device. The memory 614 may also be configured to store outputs of the neural network processor 602 (e.g., one or more image recognition decisions on the input images in the form of output data sets). The memory 614 may include any suitable memory, e.g., dynamic random access memory (DRAM), synchronous DRAM (SDRAM), double data rate DRAM (DDR DRAM), storage class memory (SCM), flash memory, etc.

The host interface 616 may be configured to enable communication between the host device and the neural network processor 602. For example, the host interface 616 may be configured to transmit memory descriptors including the memory addresses of the stored data (e.g., input data sets, weights, results of computations, etc.) between the host device and the neural network processor 602. The host interface 616 may include, e.g., a peripheral component interconnect express (PCIe) interface, or any suitable interface for communicating with the host device. The host device may include a host processor and a host memory.

The DMA controller 618 may be configured to perform DMA operations to transfer data between the neural network processor 602 and the host device. For example, as discussed above, the host device can store the instructions, input data sets, and the weights in the memory 614. The host device can provide the memory addresses for the stored instructions, data, and the weights to the neural network processor 602 (e.g., in the form of memory descriptors). The neural network processor 602 can then obtain the stored instructions, data, and the weights based on the memory addresses provided by the host device. The neural network processor 602 can also store the results of computations (e.g., one or more image recognition decisions) in the memory 614, and provide the memory addresses for the stored results to the host device.

The state buffer 608 may be configured to provide caching of data used for computations at the computing engine 604. The data cached at the state buffer 608 may include, e.g., the input data sets and the weights acquired from the memory 614, as well as intermediate outputs of computations at the computing engine 604. The caching can reduce the effect of memory access bottleneck (e.g., caused by the latencies at the memory 614, the DMA controller 618, the interconnect 620, etc.) on the performance of the computing engine 604. The state buffer 608 can be an on-chip memory device and may include a static random access memory (SRAM) or any suitable memory.

The computation controller 606 may be configured to provide controls to various components of the neural network processor 602 to perform neural network computations. In some implementations, the computation controller 606 may read the instructions stored in the memory 614 and schedule the executions of the instructions by the computing engine 604. In the first embodiment, the computation controller 606 may perform scheduling of loading the weights into the computing engine 604 prior to reading the input data elements from the state buffer 608. For example, as discussed with reference to FIG. 2 and FIG. 4, the computation controller 606 may provide the opcode 230 and the weight load signal 232 to the computing engine 604 based on the instructions received from the host device. The computation controller 606 may provide appropriate values of the opcode 230 to the computing engine 604 which may be decoded by each PE in the computing engine to perform a corresponding operation. For example, the computing engine 604 may use the weight load signal 232 and the opcode 230 to pre-load the weights in all the PEs in the computing engine 604. Once the weights have been pre-loaded, the computation controller 606 may perform scheduling of loading the input data elements into the computing engine 604, sequentially, in uniform time periods, from the state buffer 608 to start the arithmetic computations.

In the second embodiment, the computation controller 606 may perform scheduling of loading the weights and the input data elements into the computing engine 604, sequentially, in uniform time periods, from the state buffer 608. The computation controller 606 may schedule loading of the weights and the input data elements in a respective first PE of each row in the systolic array 302 using a respective row data bus. For example, a respective input data element and a weight value may be loaded per cycle in the first PE of the respective row.

In another embodiment, the computation controller 606 may schedule loading of the weights in the systolic array 302 in parallel for each row using a respective column data bus for each PE in a given row. For example, weights for each row may be loaded in parallel per cycle. In some implementations, the computation controller 606 may determine a data type for the input data set based on the instructions received from the host device. The instructions may be in the form of an opcode. The data type may indicate a size and a type of the input data element, e.g., 4-bit, 8-bit, 16-bit, signed, unsigned, or floating point.

The computing engine 604 may be configured to perform computations for the neural network. In some embodiments, the computing engine 604 may include a set of PEs configured to perform one or more arithmetic operations involved in the neural network computations. Each PE may perform multiply-accumulate operations using input data sets and associated weights. For example, the computing engine 604 may include the systolic array 302, and the circuit 304 comprising the zero input data detectors 306a-306x, and the zero weight detectors 308a-308x. In some embodiments, the zero input data detectors 306a-306x, and the zero weight detectors 308a-308x may be external to the computing engine 604. The computing engine 604 may execute instructions as scheduled by the computation controller 606 to load the weights and the input datasets sequentially from the state buffer 608 into the computing engine 604.

In the first embodiment, the weights may be pre-loaded prior to reading the input datasets from the state buffer 608, as discussed with reference to FIG. 4. The respective zero weight indicators corresponding to each weight may be cached locally in each PE and the cached values may be used to perform arithmetic computations with the respective input data element as the input data element is fed into the computing engine 604 along with the corresponding zero data element indicator. In the second embodiment, the weights and the input datasets may be read simultaneously from the state buffer 608, as discussed with reference to FIG. 5. The corresponding zero data element indicator and the zero weight indicator may be provided by the respective zero detector circuits and propagated sequentially from one PE to another for the respective row. The weights and the input datasets can be obtained from the state buffer 608 using one or more interfaces. In certain embodiments, the computing engine 604 may perform the arithmetic computations to reduce the dynamic power consumption of the systolic array 302 using the respective zero data element indicator and the zero weight indicator signals as discussed with reference to FIGS. 2-5, and provide the computations results to be stored in the output buffer 610.

The output buffer 610 may include a set of registers to store the output data sets generated by the computing engine 604. In some implementations, the output buffer 610 may also enable additional processing such as, e.g., a pooling operation to reduce the size of the stored outputs. In some implementations, the computing engine 604 can be operated to perform computations for a particular neural network layer, and the output buffer 610 can process the outputs of that neural network layer and store the processed output datasets (with or without processing by the activation engine 612) at the state buffer 608. The processed output datasets may be used by the computing engine 604 as the intermediate outputs. In some embodiments, the output buffer 610 may include adders to accumulate the partial sums generated for different sets of filters and input data sets to generate a convolution output array. The final output value of the convolution output array stored in the state buffer 608 can be retrieved by the computation controller 606 for storing at the state buffer 608.

The activation engine 612 may be configured to apply one or more activation functions (e.g., ReLu function) on the output of the output buffer 610. For example, the activation engine 612 may include one or more lookup tables (e.g., in the form of multiplexer circuits) that can map the input to one of the candidate outputs representing the result of applying the activation function to the input. In some examples, the activation engine 612 may also include a bypass path to allow outputs from the output buffer 610 to be stored directly at the state buffer 608 when activation functions are not to be applied.

Figure 7:
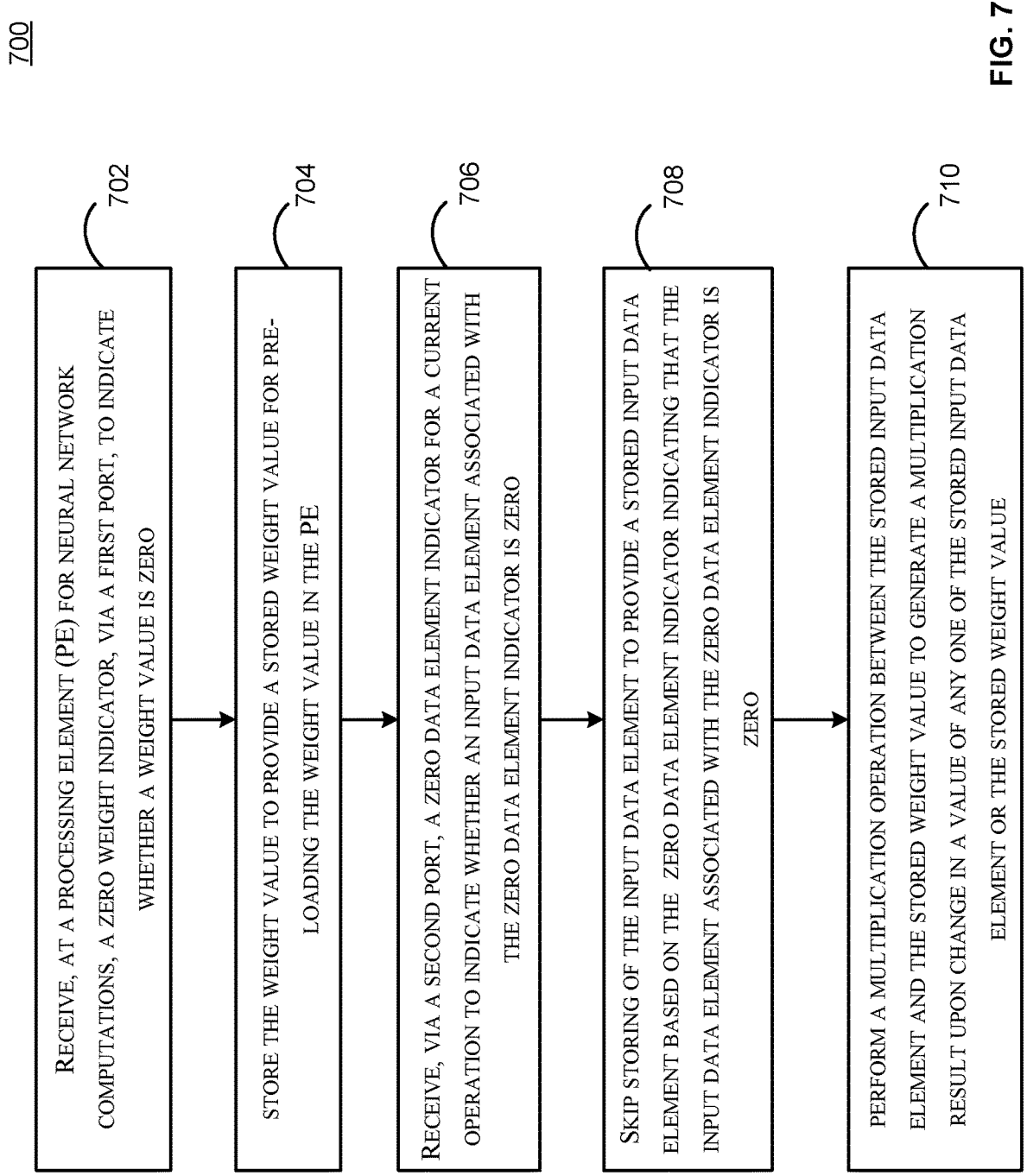
FIG. 7 shows a method executed by a processing element for neural network computations, according to some embodiments of the disclosed technologies.

FIG. 7 shows a method 700 executed by a PE for neural network computations, according to some embodiments of the disclosed technologies. The PE may be part of the systolic array 302, e.g., the PE 00. The systolic array 302 may be part of the computing engine 704.

In a step 702, the PE may receive a zero weight indicator, via a first port, to indicate whether a weight value is zero. For example, the PE 00 may include means to receive the zero weight indicator 228 to indicate that the weight 224 is zero. The weight 224 may have been received from the host device into the memory 614. The PE 00 may receive the zero weight indicator 228 from the first zero weight detector 308a via the row input bus 102. As discussed with reference to FIG. 3, the first zero weight detector 308a may include comparators or other circuits to determine that the weight 224 is zero. For example, the first zero weight detector 308a may set the zero weight indicator 228 to "1" when it detects that the weight 224 is zero. The computation controller 606 may schedule loading of the weight 224 corresponding to the filter0, sequentially, in uniform time periods, from the state buffer 608 into the PE 00 of the computing engine 604 prior to scheduling loading of the input data elements into the PE 00.

In a step 704, the PE may store the weight value to provide a stored weight value for pre-loading the weight value in the PE. For example, the PE 00 may include means for pre-loading the weight 224 in the PE 00. The computation controller 606 may provide the opcode 230 to the computing engine 604 with a certain opcode value for loading the respective weights in each PE of the computing engine 604. As discussed with reference to FIG. 2, the weight 224 may be stored in the cached weight register 220 using the weight load signal 232. The cached weight 246 previously loaded into the cache register 220 may be shifted into the weight register 206 at the start of the arithmetic computations based on the start computations signal 260. The stored weight value 248 may be used to perform arithmetic computations with the stored input data element 228.

In a step 706, the PE may receive, via a second port, a zero data element indicator for a current operation to indicate whether an input data element associated with the zero data element indicator is zero. For example, the PE 00 may include means to receive the zero data element indicator 226 to indicate that the input data element 222 associated with the zero data element indicator 226 is zero. As discussed with reference to FIG. 3, the PE 00 may receive the zero data element indicator 226 via the second port from the first zero input data detector 306a using the row input bus 102. The first zero input data detector 306a may include comparators or other circuits to determine that the input data element 222 is zero. For example, the first zero input data detector 306a may set the zero data element indicator 226 to '1' when it detects that the input data element 222 associated with the zero data element indicator 226 is zero. The input data element 222 may correspond to an input data set, e.g., the input dataset0. In one instance, the input dataset0 may belong to a dataset received from a host device into the memory 614 to perform data processing. In another instance, the input dataset0 may belong to an intermediate output generated by the computing engine 604, which have gone through an activation function in the activation engine 612. The computation controller 606 may schedule loading of the input data elements corresponding to the input dataset0, sequentially, in uniform time periods, from the state buffer 608 into the PE 00 of the computing engine 604 after loading of the weights into the systolic array.

In a step 708, the PE may skip storing of the input data element to provide a stored input data element based on the zero data element indicator indicating that the input data element associated with the zero data element indicator is zero. For example, the PE 00 may include means to skip storing of the input data element 222 to provide the stored input data element 228 based on the zero data element indicator 226 indicating that the input data element 222 associated with the zero data element indicator 226 is zero. Referring back to FIG. 4, the PE 00 may include the data element load generator 202 to generate the data load signal 242, which can be used to skip storing of the input data element 222 in the data register 204. For example, when the zero data element indicator 226 or the NOP 258 is asserted, storing of the input data element 222 in the data register 204 can be skipped. In some embodiments, the data element load generator 202 may include a NOR circuit to perform a NOR operation to set the data load signal 242 to "0" when the zero data element indicator 226 is "1", or the NOP 258 is "1." The data load signal 242 may be used to disable the loading of the input data element 222 in the data register 204 under certain conditions and therefore the stored input data element 244 may hold a value from the previous operation.

In a step 710, the PE may perform a multiplication operation between the stored input data element and the stored weight value to generate a multiplication result upon change in a value of any one of the stored input data element or the stored weight value. For example, the PE 00 may include means to perform a multiplication operation between the stored input data element 244 and the stored weight value 248 to generate the multiplication result 250 upon change in a value of the stored input data element 244 or the stored weight value 248. Referring back to FIG. 4, the PE 00 may include the multiplier 208 to perform the multiplication operation between the stored input data element 244 and the stored weight value 248 to generate the multiplication result 250. The multiplier 208 may perform the multiplication upon a change in a value of either the stored input data element 244 in the data register 204, or the stored weight value 248 in the weight register 206. As discussed previously, the value of the stored input data element 244 in the data register 204 may change based on the data load signal 242. For example, the data load signal 242 may disable loading a respective new value in the data register 204 when the zero data element indicator 226 or the NOP 258 is asserted, which may avoid toggling the stored input data element 244. Since the weight 224 has been pre-loaded in the PE 00, the stored weight value 248 does not change during the computations. Thus, dynamic power consumption can be reduced which may have occurred as a result of a multiplication operation performed by the multiplier 208.

Embodiments of the disclosed technologies can provide systems and methods to reduce dynamic power consumption in the PEs using zero detector circuits by skipping multiplication operations with a zero value on the input data element. Additionally, use of the respective zero detector circuits for detecting zeros on the input data elements and the weights entering each row of the systolic array, and passing the zero indicators to all the PEs in the array can minimize the gate count and power consumption as compared to using respective zero detectors within each PE in the array.

Figure 8:
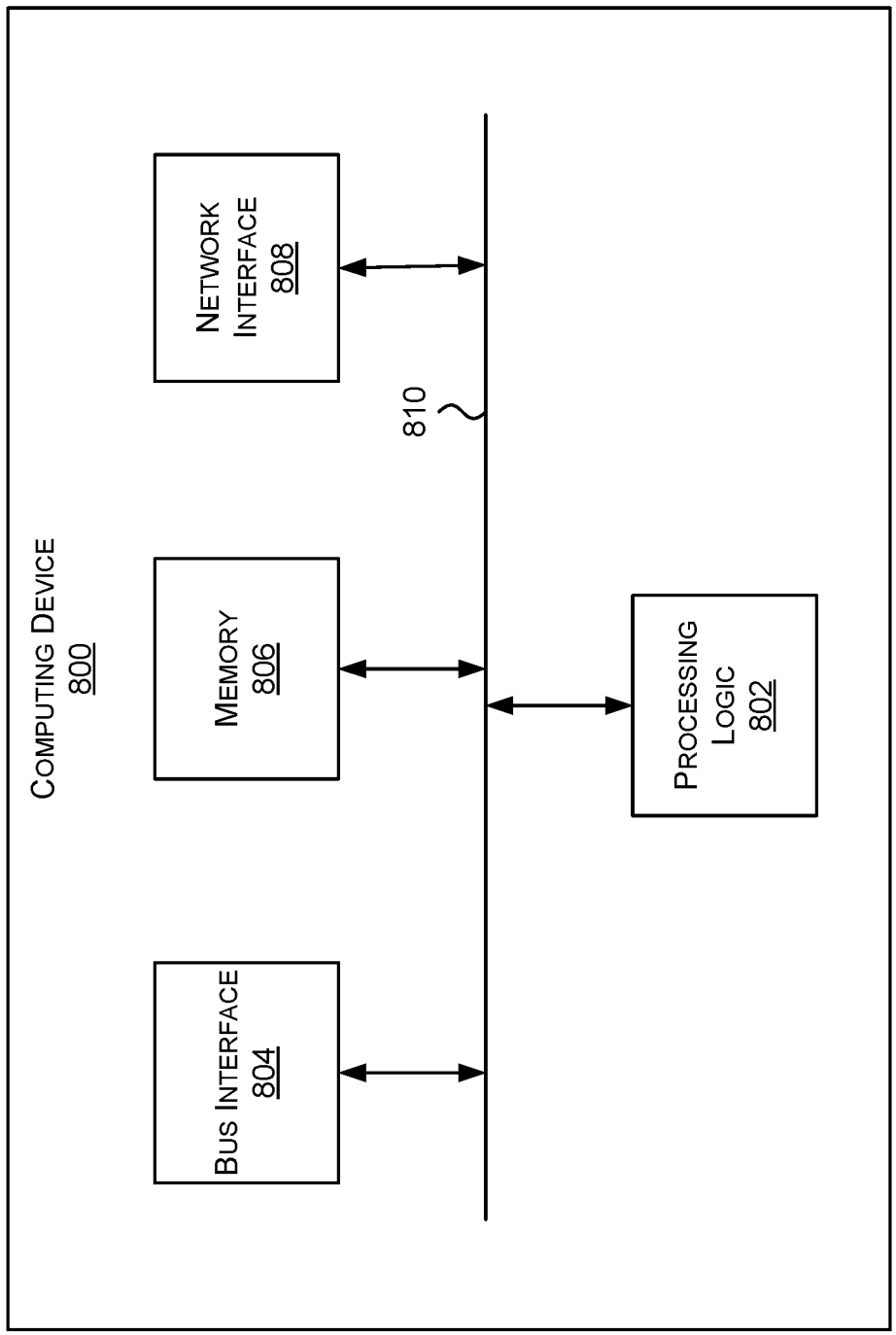
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 800 (e.g., the hardware and software resources associated with data processing) can be allocated to a client upon request.

In one example, the computing device 800 may include processing logic 802, a bus interface module 804, memory 806, and a network interface module 808. These modules may be hardware modules, software modules, or a combination of hardware and software. In certain instances, modules may be interchangeably used with components or engines, without deviating from the scope of the disclosure. The computing device 800 may include additional modules, which are not illustrated here for the ease of illustration. In some implementations, the computing device 800 may include fewer modules. In some implementations, one or more of the modules may be combined into one module. One or more of the modules may be in communication with each other over a communication channel 810. The communication channel 810 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 806. The processing logic 802 may also include hardware circuities for performing artificial neural network computations including, for example, the neural network processor 602, etc.

The access to the processing logic 802 can be granted to a client to provide the personal assistant service requested by the client. For example, the computing device 800 may host a virtual machine, on which an image recognition software application can be executed. The image recognition software application, upon execution, may access the processing logic 802 to predict, for example, an object included in an image. As another example, access to the processing logic 802 can also be granted as part of bare-metal instance, in which an image recognition software application executing on a client device (e.g., a remote computer, a smart phone, etc.) can directly access the processing logic 802 to perform the recognition of an image.

The memory 806 may include either volatile or non-volatile, or both volatile and non-volatile types of memory. The memory 806 may, for example, include random access memory (RAM), read only memory (ROM), Electrically Erasable Programmable Read-Only Memory (EEPROM), flash memory, and/or some other suitable storage media. In some cases, some or all of the memory 806 may be internal to the computing device 800, while in other cases some or all of the memory may be external to the computing device 800. The memory 806 may store an operating system comprising executable instructions that, when executed by the processing logic 802, provides the execution environment for executing instructions providing functionality to perform convolution computations for the computing device 800. The memory 806 may also store, for example, software applications for performing artificial neural network computations. The memory may also store and maintain several data structures and tables for facilitating the functionality of the computing device 800.

The bus interface module 804 may enable communication with external entities, such as a host device and/or other components in a computing system, over an external communication medium. The bus interface module 804 may include a physical interface for connecting to a cable, socket, port, or other connection to the external communication medium. The bus interface module 804 may further include hardware and/or software to manage incoming and outgoing transactions. The bus interface module 804 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 804 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 808 may include hardware and/or software for communicating with a network. This network interface module 808 may, for example, include physical connectors or physical ports for wired connection to a network, and/or antennas for wireless communication to a network. The network interface module 808 may further include hardware and/or software configured to implement a network protocol stack. The network interface module 808 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc. In some embodiments, the computing device 800 may receive a set of parameters, such as the aforementioned weight values for convolution computations, from a server through network interface module 808.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A circuit for neural network computations, the circuit comprising:
   a two-dimensional array comprising processing elements (PEs) arranged into rows and columns, wherein each row of the array is configured to receive respective input data elements corresponding to an input data set, and respective weight values;
   a respective zero input data detector circuit coupled to a leftmost PE of each row, wherein each zero input data detector circuit is configured to generate a respective zero data element indicator indicating whether an input data element for a current operation is zero; and
   a respective zero weight detector circuit also coupled to the leftmost PE of each row, wherein each zero weight detector circuit is configured to generate a respective zero weight indicator indicating whether a weight value is zero,
   wherein each PE is configured to:
      receive a respective weight value prior to starting the neural network computations;
      receive the respective zero weight indicator corresponding to the received weight value;
      store the respective weight value and the corresponding zero weight indicator;
      receive a respective input data element for the current operation;
      receive the respective zero data element indicator to indicate whether the input data element associated with the zero data element indicator is zero;
      skip storing of the received input data element to provide a stored input data element based on the received zero data element indicator indicating that the input data element associated with the zero data element indicator is zero; and
      perform a multiplication operation between the stored input data element and the stored weight value to generate a multiplication result upon change in a value of either the stored input data element or the stored weight value, and
   wherein the input data element is the received input data element, and the weight value is the received weight value for the leftmost PE in a given row.

2. The circuit of claim 1, wherein each PE is further configured to:
   store the received zero data element indicator to provide a stored zero data element indicator to a neighboring PE in the given row, wherein the stored zero data element indicator is the received zero data element indicator for the neighboring PE, and
   wherein each PE is further configured to provide the stored zero weight indicator as the received zero weight indicator, the stored input data element as the received input data element, and the stored weight value as the received weight value for the neighboring PE.

3. The circuit of claim 1, where each PE is further configured to:
   receive an opcode value to indicate an operation to be executed by the respective PE;

store a respective input partial sum received by the respective PE;

perform an addition operation between the multiplication result and the stored input partial sum to generate an addition result; and provide the stored input partial sum as an output partial sum based on the received zero data element indicator indicating that the received input data element is zero, the stored zero weight indicator indicating that the stored weight value is zero, or the opcode value indicating a no-operation (NOP) for the current operation.

4. The circuit of claim 3, wherein each PE is further configured to skip storing of the received input data element to provide the stored input data element based on the opcode value indicating the NOP for the current operation.

5. An apparatus, comprising:

a processing element (PE) for neural network computations, the PE being part of a two-dimensional array comprising PEs arranged into rows and columns, the PE comprising:

a first port to receive a zero data element indicator for a current operation to indicate whether an input data element associated with the zero data element indicator is zero;

a second port to receive a zero weight indicator to indicate whether a weight value is zero;

a data register configured to skip storing of the input data element to provide a stored input data element based on the zero data element indicator indicating that the input data element associated with the zero data element indicator is zero;

a weight register configured to store the weight value to provide a stored weight value for pre-loading the weight value in the PE prior to the current operation; and a multiplier circuit coupled to the data register and the weight register, the multiplier circuit configured to perform a multiplication operation between the stored input data element and the stored weight value to generate a multiplication result upon change in a value of any one of the data register or the weight register;

wherein each row of the two-dimensional array includes a respective zero input data detector circuit coupled to a first PE of a respective row, the respective zero input data detector configured to receive input data elements from an input dataset, generate a corresponding zero data element indicator, and pass the corresponding zero data element indictor into the first PE.

6. The apparatus of claim 5 further comprising:

a partial sum register configured to store an input partial sum received via a third port.

7. The apparatus of claim 6, further comprising:

a selector circuit configured to provide the stored input partial sum via a fourth port based on the zero data element indicator indicating that the input data element associated with the zero data element indicator, or the zero weight indicator indicating that the weight value for the current operation is zero.

8. The apparatus of claim 7, further comprising:

an adder circuit configured to perform an addition operation between the multiplication result and the stored input partial sum to generate an addition result.

9. The apparatus of claim 8, wherein the selector circuit is further configured to provide the addition result via the fourth port if both the input data element and the weight value for the current operation are not zero.

10. The apparatus of claim 5, wherein the first PE is configured to receive prior to any other PE in the respective row, sequentially, in uniform time periods, the input data elements from the input dataset, and wherein the respective zero input data detector circuit generates the corresponding zero data element indicator for each of the uniform time periods for each input data element from the input dataset, each input data element passed into the first PE along with the corresponding zero data element indicator.

11. The apparatus of claim 10, wherein each row of the two-dimensional array includes:

a respective zero weight detector circuit also coupled to the first PE of the respective row, wherein the first PE is further configured to receive prior to any other PE in the respective row, sequentially, in the uniform time periods, weight values from a set of weight values, and wherein the respective zero weight detector circuit generates a corresponding zero weight indicator for each of the uniform time periods for each weight value from the set of weight values, each weight value passed into the first PE along with the corresponding zero weight indicator prior to the current operation.

12. The apparatus of claim 11, wherein each PE of the PEs further comprises:

a respective zero data element indicator register configured to store a respective zero data element indicator corresponding to a respective input data element; and a respective zero weight indicator register configured to store a respective zero weight indicator corresponding to a respective weight value, wherein the first PE in each row is further configured to pass the respective stored zero data element indicator, the stored zero weight indicator, the stored input data element and the stored weight value to a next neighboring PE in the respective row, sequentially, in the uniform time periods.

13. The apparatus of claim 11, wherein the respective zero input data detector circuit includes a comparator to determine that the input data element for the current operation is zero, and the respective zero weight detector circuit includes another comparator to determine that the weight value is zero.

14. The apparatus of claim 5, wherein each row of the array is configured to receive the respective input data elements corresponding to a respective input data set, and respective weight values for convolution computations to be performed by a neural network processor.

15. The apparatus of claim 14, wherein the respective input data set corresponds to respective intermediate outputs generated by the array for the convolution computations.

16. An apparatus comprising:

means for receiving, at a processing element (PE) for neural network computations, a zero weight indicator to indicate whether a weight value is zero, the PE being part of a two-dimensional array comprising PEs arranged into rows and columns;

means for storing, at the PE, the weight value to provide a stored weight value for pre-loading the weight value in the PE;

means for receiving, at the PE, a zero data element indicator for a current operation to indicate whether an input data element associated with the zero data element indicator is zero;

means for skipping, at the PE, storing of the input data element to provide a stored input data element based on the zero data element indicator indicating that the input data element associated with the zero data element indicator is zero; and means for performing, at the PE, a multiplication operation between the stored input data element and the stored weight value to generate a multiplication result upon change in a value of either the stored input data element or the stored weight value;

wherein each row of the two-dimensional array includes a respective zero input data detector circuit coupled to a first PE of a respective row, the respective zero input data detector configured to receive input data elements from an input dataset, generate a corresponding zero data element indicator, and pass the corresponding zero data element indictor into the first PE.

17. The apparatus of claim 16 further comprising:

means for receiving, at the PE, an input partial sum;

means for storing the input partial sum to provide a stored input partial sum;

means for performing an addition operation between the multiplication result and the stored input partial sum to generate an addition result; and means for selecting the stored input partial sum to provide as an output partial sum upon determining that the input data element or the weight value for the current operation is zero.

18. The apparatus of claim 17, wherein the means for selecting include a multiplexer circuit.

19. The apparatus of claim 16, wherein the means for performing the multiplication operation include a multiplier circuit.

* * * * *